United States Patent [19]

Gregory et al.

[11] Patent Number: 4,791,155

[45] Date of Patent: Dec. 13, 1988

[54] ASSEMBLY FOR MONITORING IONISING RADIATION

[75] Inventors: David P. Gregory, Wilmslow; Bernard J. Dean, Knutsford; Stephen R. Postle, Wilmslow, all of England

[73] Assignee: Ciba-Geigy AG, Basel, Switzerland

[21] Appl. No.: 76,719

[22] Filed: Jul. 22, 1987

[30] Foreign Application Priority Data

Jul. 24, 1986 [GB] United Kingdom ............... 8618113

[51] Int. Cl.$^4$ ................... G01T 1/04; C08L 89/00
[52] U.S. Cl. ................... 524/22; 250/474.1; 252/408.1; 252/600; 252/964; 436/58; 436/902
[58] Field of Search ............ 250/474.1; 252/408.1, 252/600, 964; 436/58, 902; 524/22

[56] References Cited

U.S. PATENT DOCUMENTS

| | | | |
|---|---|---|---|
| 3,787,687 | 1/1974 | Trumble | 250/474.1 |
| 3,959,571 | 5/1976 | Yahagi et al. | 428/537 |
| 4,001,587 | 1/1977 | Panchenkov et al. | 250/474.1 |
| 4,006,023 | 1/1977 | McLaughlin et al. | 96/90 |
| 4,102,893 | 7/1978 | Garner et al. | 260/326 |
| 4,410,708 | 10/1983 | Yahagi et al. | 548/407 |
| 4,677,203 | 6/1987 | Yahagi et al. | 546/15 |

FOREIGN PATENT DOCUMENTS

| | | |
|---|---|---|
| 2160981 | 7/1973 | France . |
| 2230632 | 12/1974 | France . |
| 920689 | 3/1963 | United Kingdom . |

*Primary Examiner*—Morton Foelak
*Assistant Examiner*—S. A. Acquah
*Attorney, Agent, or Firm*—Wenderoth, Lind & Ponack

[57] ABSTRACT

An assembly for monitoring ionising radiation which comprises coated on a base a binder layer containing a polychlorinated hydrocarbon and a color former.

The assembly can be used to monitor levels of radiation of from 0.1 MRads to 10.0 MRads.

20 Claims, No Drawings

ASSEMBLY FOR MONITORING IONISING RADIATION

This invention relates to an assembly for monitoring ionising radiation.

It is becoming increasingly important to monitor ionising radiation to determine the back-ground radiation in countries where it is known to be high, to monitor the escape of radioactive species from nuclear power stations and to determine if goods have been subjected to sufficient radiation when being sterilised by ionising radiation.

By ionising radiation is meant radiation of sufficient energy to displace electrons from their orbits around the nuclei and hence to produce positively charged ions.

Examples of ionising radiation are gamma rays, hard X-rays, electron beams and cosmic radiation.

In British patent specification No. 920 689 there is described a radiation indicator. It states in No. 920 689 that when halogen-containing and especially chloro-containing polymers are exposed to ionising radiation the hydrogen halo-acid is liberated and this can change the color of particular acid-sensitive dyes to monitor the radiation. Various acid sensitive dyes are listed but all of these are so-called indicator dyes which change from one colour to another colour at a certain predetermined pH-value for each dye. This means it is an all or nothing reaction and a certain dosage of radiation has to be exceeded before enough halo-acid is liberated to lower the pH-value sufficiently to cause the colour change.

We have found that a more sensitive and easily readable radiation monitor is obtained if instead of using an acid sensitive dye selected classes of colour formers of the type used in pressure sensitive colour recording systems are used.

According to the present invention there is provided an assembly for the monitoring of ionising radiation which comprises coated on a base a layer which has been formed by drying down an aqueous emulsion of a binder having incorporated therein an organic solvent solution of a polychlorinated hydrocarbon and a solution or dispersion of at least one colour former of the general formula

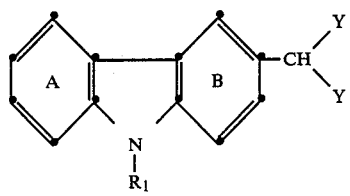
(1)

wherein Y represents an amino-substituted phenyl radical of the formula

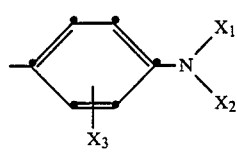

or an indolyl radical of the formula

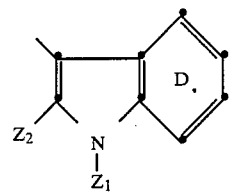

in which formulae each of $X_1$ and $X_2$ independently represent hydrogen, alkyl of 1 to 12 carbon atoms which is unsubstituted or substituted by halogen, hydroxyl, cyano, phenyl or lower alkoxy; cycloalkyl, phenyl, benzyl, or phenyl or benzyl which is substituted by halogen, lower alkyl or lower alkoxy, or $X_1$ and $X_2$ together with the nitrogen atom to which they are attached represent a 5- or 6-membered, preferably saturated, heterocyclic radical, $X_3$ represents hydrogen, halogen, nitro, lower alkyl or lower alkoxy, these alkyl and alkoxy groups being unsubstituted or substituted by halogen, hydroxyl, cyano or lower alkoxy, acyl of 1 to 12 carbon atoms, phenyl, benzyl, or phenyl or benzyl which is substituted by halogen, lower alkyl, lower alkoxy or nitro, and $Z_2$ represents hydrogen, lower alkyl or phenyl and the rings A, B and D independently can be further substituted by cyano, nitro, halogen, lower alkyl, lower alkoxy or lower alkylcarbonyl, or of the general formula

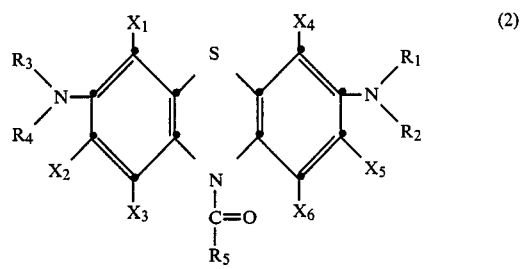
(2)

where each of $R_1$, $R_2$, $R_3$, $R_4$ and $R_5$ are alkyl, aryl or aralkyl, and each of $X_1$, $X_2$, $X_3$, $X_4$, $X_5$ and $X_6$ are hydrogen, alkyl, alkoxy, aryl or aralkyl, or of the general formula

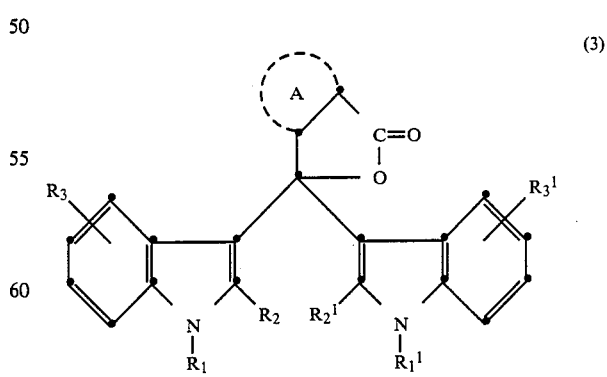
(3)

wherein the ring A represents a fused-on optionally substituted benzene, naphthalene or heterocyclic ring, in particular a pyridine or quinoline ring, $R_2$ and $R_2^1$ each represents hydrogen or lower alkyl or an aryl radical, preferably a radical of the benzene series, $R_3$ and $R_3^1$ each represent hydrogen or a lower alkyl or alkoxy group and $R_1$ and $R_1^1$ each represent hydrogen or preferably, an aralkyl radical or an optionally substituted alkyl or alkenyl radical, other than an aralkyl radical, with 1 to 18 and 3 to 18 carbon atoms respectively.

or of the general formula

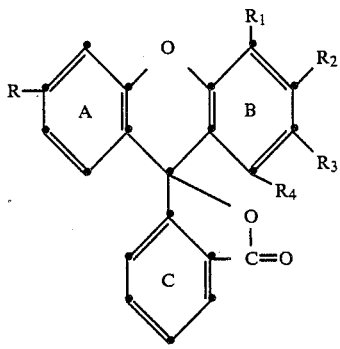

(4)

wherein R is a piperidino grop, a pyrrolidino group, a morpholino group, an N-lower alkyl-cyclohexylamino group or an N-benzylcyclohexylamino group, $R_1$ is a hydrogen atom, a lower alkyl group, a substituted or unsubstituted amino group or a halogen atom, $R_2$ is a hydrogen atom, a lower alkyl group, a lower alkoxy group or a halogen atom, $R_3$ is a hydrogen atom, a $C_{1-8}$ alkyl group, a phenyl group, a piperidino group, a methylpiperidino group, a pyrrolidino group, a morpholino group, a group of the formula

where X represents a hydrogen atom, an acyl group, a lower alkyl group, a benzyl group, a cyclohexyl group or a substituted or unsubstituted aryl group; and Y represents a hydrogen atom, an alkyl group or a substituted or unsubstituted benzyl group, a halogen atom, an alkoxy group or a substituted or unsubstituted diphenylmethylamino group; $R_4$ is a hydrogen atom, a lower alkyl group or a alkoxy group, provided that $R_1$ and $R_2$, and $R_3$ and $R_4$ may be groups represented by the formula —CH=CH—CH=CH—, and, in this case, the naphthalene ring may have a halogen atom or a substituted or unsubstituted amino group, and the benzene ring C may have 1 to 4 halogen atoms, provided that when R is piperidino, pyrrolidino, morpholino, cyclohexylamino or N-methylcyclohexylamino, at least one of $R_1$, $R_2$, $R_3$ and $R_4$ is a substituent other than hydrogen, lower alkyl and halogen.

In the compounds of the general formula (1), the substituents $X_1$ and $X_2$ in the amino-substituted phenyl moiety represent hydrogen or alkyl of 1 to 12 carbon atoms such as methyl, ethyl, propyl, hexyl, octyl, nonyl and dodecyl as well as the branched isomers thereof. Preferred alkyl radicals $X_1$ and $X_2$ are the lower alkyl radicals having 1 to 6 carbon atoms, where methyl and ethyl are particularly preferred. All these alkyl radicals $X_1$ and $X_2$ may be further substituted by halogen, hydroxyl, cyano, phenyl or (lower) alkoxy having 1 to 6 carbon atoms.

Further, $X_1$ and $X_2$ may denote cycloalkyl, preferably having 5 to 6 carbon atoms, phenyl or benzyl, where both the phenyl and benzyl radical is optionally substituted by halogen, (lower) alkyl or alkoxy having 1 to 6 carbon atoms, preferably 1 or 2 carbon atoms. $X_1$ and $X_2$ may form together with the nitrogen atom to which they are attached a 6- or, preferably, 5-membered ring which is preferably saturated.

Substituents $X_3$ in said amino-substituted radical denotes hydrogen, halogen, nitro, (lower) alkyl or alkoxy having 1 to 6 carbon atoms such as methyl, ethyl, butyl and hexyl, where ethyl and butyl are preferred, these alkyl and alkoxy radicals being optionally substituted by halogen, hydroxyl, cyano, lower alkoxy, acyl, preferably —COR, where R is alkyl of 1 to 12 carbon atoms, phenyl or benzyl, both of them being optionally substituted by halogen, lower alkyl or alkoxy or nitro, where phenyl is preferred.

$Z_2$ represents hydrogen, lower alkyl or phenyl, where phenyl is preferred and the rings s, B and D are optionally substituted by cyano, nitro, halogen, lower alkyl or alkoxy or lower alkylcarbonyl.

In the compounds of the formula (2), the substituents $R_1$ to $R_6$ independently from each other may denote alkyl, preferably having 1 to 12 and particularly 1 to 8 carbon atoms, aryl, preferably phenyl which may be further substituted, or aralkyl such as benzyl or phenylethyl. $X_1$ to $X_6$ independently from each other denote hydrogen, alkyl or alkoxy, each containing preferably 1 to 4 carbon atoms, aryl, preferably phenyl, or aralkyl where benzyl is preferred.

Ring A in formula (3) represents a fused-on benzene, naphthalene or heterocyclic ring such as a pyridine or quinoline ring. These ring systems are optionally substituted by halogen, preferably chlorine or bromine, nitro or cyano. $R_2$ and $R_2^1$ represent hydrogen or (lower) alkyl having 1 to 6 carbon atoms, preferably methyl, or an aryl radical, preferably of the benzene series such as phenyl. $R_3$ and $R_3^1$ represent hydrogen or (lower) alkyl or alkoxy each having 1 to 6 carbon atoms and $R_1$ and $R_1^1$ represent hydrogen, or, preferably, an aralkyl radical such as benzyl or phenylethyl, or alkyl or alkenyl having 1 to 18 and 3 to 18 carbon atoms, respectively, where alkyl with 6 to 10 carbon atoms are particularly preferred. These alkyl and alkenyl radicals are optionally substituted by hydroxy, nitro, cyano or carbalkoxy substituents.

In formula (4), the substituent R is piperidino, pyrrolidino, morpholino, a N-lower alkyl-cyclohexylamino group or an N-benzylcyclohexylamino group, and preferably a N-ethylcyclohexylamino group. $R_1$ is hydrogen or (lower) alkyl having 1 to 6 carbon atoms, an amino group which is optionally substituted, preferably by lower alkyl, or $R_1$ is hydrogen. $R_2$ is hydrogen, lower alkyl or alkoxy, preferably methyl, or halogen. Substituent $R_3$ is hydrogen or alkyl having 1 to 8, preferably 1 to 4 carbon atoms, phenyl, piperidino, methylpiperidino, pyrrolidino, morpholino or a group of the formula —NXX. In this group, which is a preferred substituent, $R_3$, X denotes hydrogen, acyl, preferably —COR, where R is alkyl having 1 to 8 carbon atoms, (lower) alkyl having 1 to 6 carbon atoms, benzyl, cyclohexyl or an aryl group, preferably phenyl, which may be substituted by lower alkyl or alkoxy or halogen, in particular chlorine. Y is hydrogen, alkyl having preferably 1 to 8 carbon atoms, benzyl which optionally is substituted by methyl or chlorine, halogen, alkoxy having preferably 1 to 8 carbon atoms or diphenylmethylamino which may be substituted by lower alkyl or halogen.

The carbazoylmethane colour formers of formula (1) are described in British patent specification No. 1 548 059. The preferred colour formers for use in the present invention are those where both symbols Y represent an amino-substituted phenyl radical. The most preferred colour former of formula (1) for use in the present invention is colour former A of formula (5)

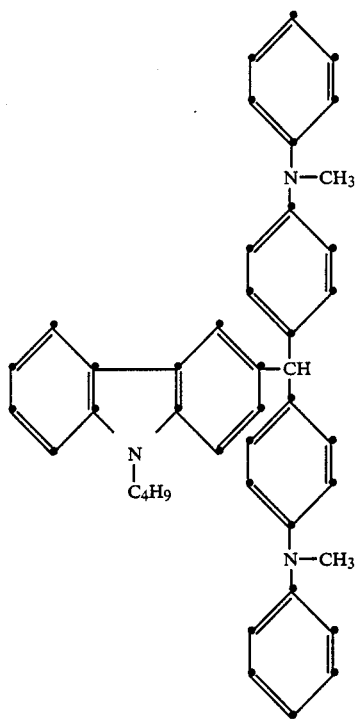

The di-hydrothiazines of formula (2) are fairly old compounds derived from methylene blue. The preferred compounds of formula (2) are those wherein $R_1$, $R_2$, $R_3$ and $R_4$ are each alkyl groups having from 1 to 3 carbon atoms and $R_5$ is phenyl. The most preferred compound is 10-benzoyl-3,7-bis(dimethylamino)phenothiazine which is commonly called benzoyl leuco methylene blue.

The colour formers of formula (3) are indoles and anhydrides of aromatic or heteroaromatic vicinal dicarboxylic acids as described in British Patent Specification No. 1 389 716.

The most preferred compound of formula (3) is colour former B which has the formula

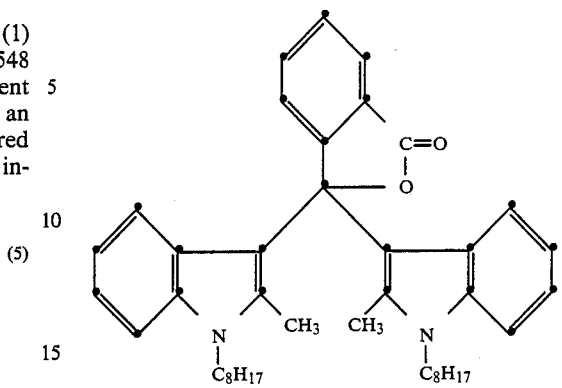

(3a)

The colour formers of formula (4) are fluoran derivatives as described in U.S. Pat. No. 4,410,708.

The most preferred compound of formula (4) is the colour former C which has the formula

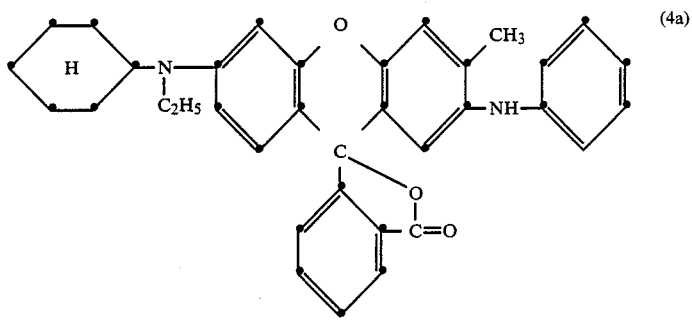

(4a)

The preferred polychlorinated hydrocarbons are polyvinyl chloride and polyvinylidene chloride.

Suitable organic solvents for polyvinylchloride and polyvinylidene chloride are halogenated aromatic solvents, where 2,4-dichloro-toluene is preferred.

The preferred binder for the aqueous emulsion is gelatin. Other suitable binders are aqueous latexes of vinyl and acrylate polymers, casein, polyvinyl alcohol, albumin and modified gelatin such as phthalated gelatin. Gelatin and derivatives thereof are preferred because it is easy to coat a gelatin based emulsion on to a supporting base.

Preferably a whitening agent is present in the binder layer. This helps to accentuate the colour change when viewed by reflection from white to colour formed by the colour former when reacted on by the liberated hydrochloric acid. Preferably this whitening agent is titanium dioxide.

In order to form a dispersion of the colour former in gelatin the colour former is dissolved in an organic solvent for example 2,4-dichloro-toluene, and this solution is dispersed in the aqueous gelatin in the presence of a non-ionic wetting agent and an emulsion stabiliser. The preferred emulsion stabiliser is an alkylated triphenyl phosphate.

In order to improve the sensitivity of assembly preferably there is present a compound of a heavy element. Atoms of heavy elements have a higher stopping power for ionising radiation than do the other components of the assembly.

Preferably the heavy element used has an atomic number equal to or higher than 56 which is barium. The preferred heavy element is lead and the preferred lead compound is chloride which is a water-insoluble white compound which can be incorporated as a dispersion in a binder such as gelatin or modified gelatin.

Because of the numbers of components present already in the emulsion layer which comprises the polychlorinated hydrocarbon and the colour former preferably the heavy element compound is present in a layer which is adjacent to this emulsion layer. For the best results preferably there is present in the assembly a top layer which comprises an emulsion of a heavy metal compound in a binder, a middle layer which comprises in a binder an emulsion of a polychlorinated hydrocarbon and the colour former and an underlayer next to the base which comprises an emulsion of a heavy metal compound in a binder.

Preferably, in the assembly of the present invention as just described, there is present in the topmost layer and in the underlayer a U.V. absorbing compound. Most preferably, a U.V. absorbing compound is also present in the middle layer.

A tripack assembly of this type is protected against premature colouration due to U.V. light. Also it has been found that when a colouration has been formed in an assembly when it has been exposed to ionising radiation sometimes this colour fades due to U.V. light. This colour fading is also prevented in a tripack assembly of this type.

The choice of U.V. absorbing compounds is not critical, the U.V. absorbing compound known to be useful in photographic materials can be used. Preferred are those of the benzotriazole type.

It is also preferred to use in the middle layer of this tripack assembly titanium dioxide as a whitening agent in an amount sufficient to accentuate the colour change due to the reaction of the colour former with hydrochloric acid.

Preferably, the base for the assembly is any flexible or rigid base which is used in the photographic industry. However, most preferably the base is an opaque photographic paper base. Usefully the base is a polyethylene laminated paper base which has been treated in a known manner to enable an aqueous coating to be applied thereto.

The assemblies of the present invention can be formulated to monitor levels of radiation of from 0.1 MRads to 10.0 MRads. Single layer assemblies which comprise a heavy metal compound in the layer but no U.V. absorber are the most sensitive assemblies and are preferably used to monitor the range of 0.1 to 1.0 MRads but these assemblies are required to be stored in the dark in the absence of U.V. light. The tripack assemblies as hereinbefore described can be used to monitor ionising radiation preferably in the range of 1.0 to 10.0 MRads.

Mega-Rads is a measure of the accumulated absorbed dosage of ionising radiation. For example to prevent potatoes sprouting they should be subjected to 0.015 MRads. To prolong the shelf life of poultry or shrimps these goods should be exposed to about 0.2 Mrads. To decontaminate spices and other goods in which small insects may be present these goods should be subjected to 1.0 MRads. To sterilize medical dressings, instruments and containers these goods should be subjected to between 5.0 and 10.0 MRads.

It is possible to prepare assemblies of the present invention in which a graduated colour change is visible. Thus a faint colour appears after 0.1 MRad, a more distinct colour after 0.5 MRads, a strong colour after 2 MRads and a very strong colour after 5 MRads. These colours can be compared with standards to determine the radiation dosage received. Preferably, two labels are prepared one monitoring the range 0.1 to 1.0 MRads and the other the range 1.0 to 10.0 MRads.

Such a graduated colour change is not possible using the pH-sensitive indicator dyes of the prior art.

Further the assemblies of the present invention are more sensitive than the assemblies of the prior art and further they can be formulated to provide any range of sensitivities between 0.1 and 10.0 MRads.

Factors affecting the sensitivity i.e. colour production include the colour former used and the colour former which yields the most sensitive assembly is compound A as hereinbefore set forth.

Other factors are the presence or absence of U.V. absorber and the presence or absence of a heavy metal compound.

Polyvinyl chloride is the preferred polychlorinated hydrocarbon and the amount of this compound in the assembly has a great effect of the sensitivity, the greater the concentration the greater the sensitivity. However care has to be taken to limit the concentration of polyvinyl chloride to ensure that a stable emulsion is obtained.

On the other hand the lower the concentration of gelatin in the binder the higher the sensitivity. However too little gelatin leads to an unstable emulsion.

The following Example will serve to illustrate the invention.

EXAMPLE

Two emulsions were prepared. The first emulsion comprises as a w/w concentration
5% U.V. absorber of the formula

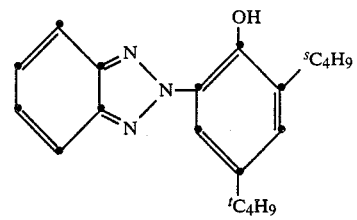

15% 2,4-dichlorotoluene
15% Reofos 65 ®
1% Lead chloride
3% Gelatin
and 0.2% non-ionic wetting agent This emulsion was prepared by dissolving the U.V. absorber in the Reofos 65 ® and 2,4-dichlorotoluene with heat. This solution was added to the gelatin solution which had been prepared as a 10% aqueous solution and which contained a dispersion of the lead chloride and the non-ionic wetting agent at 40° C. The resulting mixture was subjected to ultra-sonic mixing to produce a stable emulsion.

The second emulsion comprised as a w/w concentration
15% polyvinylchloride
20% 2,4-dichlorotoluene
5% Reofos 65 ®
0.25% titanium dioxide
2.5% gelatin
0.75% U.V. absorber
0.2% compound A (colour former)
0.2% non-ionic wetting agent This emulsion was prepared by heating together the polyvinylchloride, the Reofos 65® and the 2,4-dichlorotoluene until all the solids had dissolved. This hot solution was added to a 10% aqueous solution of the gelatin which comprised a dispersion of the titanium dioxide, the U.V. absorber and the non-ionic wetting agent. To this mixture was added the requisite mixture of colour former A dissolved in the minimum amount of 2,4-dichlorotoluene. The mixture was then subjected to ultra-sonic mixing to produce a stable emulsion.

A long strip of polyethylene-laminated paper of the type used as a base for photographic paper material which had been treated in a known manner to enable an aqueous coating to be adhered thereto was then coated with a layer of the first emulsion. This layer was dried and then a layer of the second emulsion was coated on the dried layer of the first emulsion. This layer was dried and another layer of the first emulsion was coated thereon and dried.

This tripack was then exposed to various dosages of ionising radiation from a Cobalt 60 source.

| Dosage Level (MRad) | Relative Colour Density |
| --- | --- |
| 10 | 10 |
| 5 | 5 |
| 1 | 2 |
| 0.5 | 0.5 (faint colour) |
| 0 | 0 |

Four similar tripacks were prepared. In the second tripack the second emulsion contained 0.2% benzoyl leuco methylene blue instead of colour former, which is a preferred colour former derived from general formula (2). In the third tripack the second emulsion contained 0.2% of colour former B instead of A. In the fourth tripack the second emulsion contained 0.2% of colour former C instead of A. In the fifth tripack the second emulsion contained 0.2% crystal violet lactone instead of compound A. Crystal violet lactone is a well-known colour former but is not a colour former covered by any one of formula (1) to (4) as hereinbefore set forth.

The four tripacks were each exposed to 10 MegaRads using the same Cobalt 60 source.

In the case of the second, third and fourth tripack the relative colour density was 5. In the case of the fifth tripack which is not an assembly according to the present invention no visible colour change was observed.

A sixth tripack was prepared as above containing colour former but in this case no lead chloride was present in the first and third emulsion. This tripack was exposed to 10 MegaRads from the Cobalt 60 source. In this case the relative colour density obtained was only 4.

We claim:

1. An assembly for the monitoring of ionising radiation which comprises coated on a base a layer which has been formed by drying down an aqueous emulsion of a binder having incorporated therein an organic solvent solution of a polychlorinated hydrocarbon and a solution or dispersion of at least one colour former of the general formula

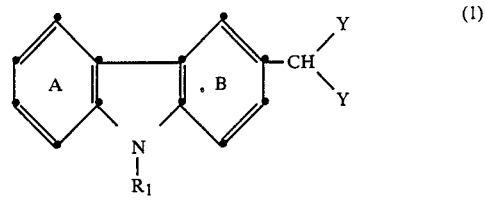

wherein Y represents an amino-substituted phenyl radical of the formula

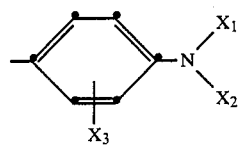

or an indolyl radical of the formula

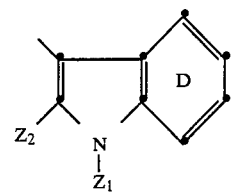

in which formulae each of
$X_1$ and $X_2$ independently represent hydrogen, alkyl of 1 to 12 carbon atoms which is unsubstituted or substituted by halogen, hydroxyl, cyano, phenyl or lower alkoxy; cycloalkyl, phenyl, benzyl, or phenyl or benzyl which is substituted by halogen, lower alkyl or lower alkoxy, or
$X_1$ and $X_2$ together with the nitrogen atom to which they are attached represent a 5- or 6-membered, preferably saturated, heterocyclic radical,
$X_3$ represents hydrogen, halogen, nitro, lower alkyl or lower alkoxy, these alkyl and alkoxy groups being unsubstituted or substituted by halogen, hydroxyl, cyano or lower alkoxy, acyl of 1 to 12 carbon atoms, phenyl, benzyl, or phenyl or benzyl which is substituted by halogen, lower alkyl, lower alkoxy or nitro, and
$Z_2$ represents hydrogen, lower alkyl or phenyl and the rings A, B and D independently can be further substituted by cyano, nitro, halogen, lower alkyl, lower alkoxy or lower alkylcarbonyl,
or of the general formula

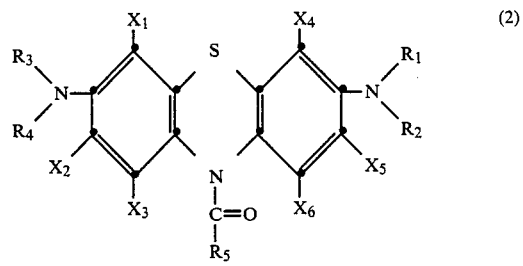

where each of $R_1$, $R_2$, $R_3$, $R_4$ and $R_5$ are alkyl, aryl or aralkyl, and each of $X_1$, $X_2$, $X_3$, $X_4$, $X_5$ and $X_6$ are hydrogen, alkyl, alkoxy, aryl or aralkyl, or of the general formula

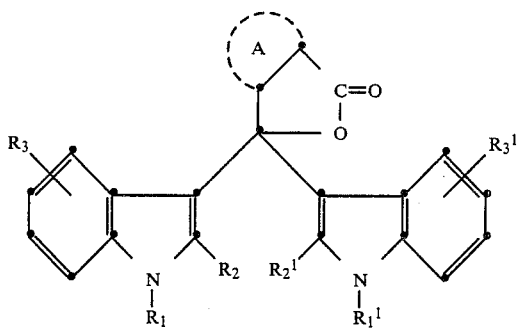

(3)

wherein the ring A represents a fused-on optionally substituted benzene, naphthalene or heterocyclic ring, in particular a pyridine or quinoline ring, $R_2$ and $R_2^1$ each represents hydrogen or lower alkyl or an aryl radical, preferably a radical of the benzene series, $R_3$ and $R_3^1$ each represent hydrogen or a lower alkyl or alkoxy group and $R_1$ and $R_1^1$ each represents hydrogen or preferably, an aralkyl radical or an optionally substituted alkyl or alkenyl radical, other than an aralkyl radical, with 1 to 18 and 3 to 18 carbon atoms respectively,
or of the general formula

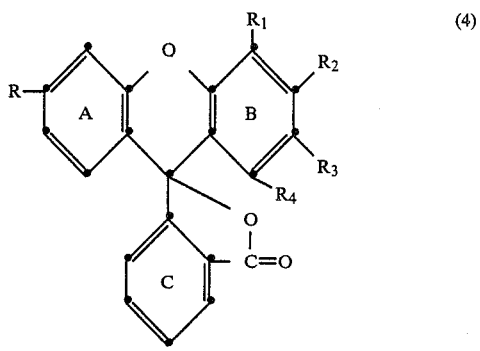

(4)

wherein R is a piperidino group, a pyrrolidino group, a morpholino group, an N-lower alkyl-cyclohexylamino group or an N-benzylcyclohexylamino group, $R_1$ is a hydrogen atom, a lower alkyl group, a substituted or unsubstituted amino group or a halogen atom, $R_2$ is a hydrogen atom, a lower alkyl group, a lower alkoxy group or a halogen atom, $R_3$ is a hydrogen atom, a $C_{1-8}$ alkyl group, a phenyl group, a piperidino group, a methylpiperidino group, a pyrrolidino group, a morpholino group, a group of the formula

where X represents a hydrogen atom, an acyl group, a lower alkyl group, a benzyl group, a cyclohexyl group or a substituted or unsubstituted aryl group; and Y represents a hydrogen atom, an alkyl group or a substituted or unsubstituted benzyl group, a halogen atom, an alkoxy group or a substituted or unsubstituted diphenylmethylamino group; $R_4$ is a hydrogen atom, a lower alkyl group or a alkoxy group, provided that $R_1$ and $R_2$, $R_3$ and $R_4$ may be groups represented by the formula —CH═CH—CH═CH—, and, in this case, the naphthalene ring may have a halogen atom or a substituted or unsubstituted amino group, and the benzene ring C may have 1 to 4 halogen atoms, provided that when R is piperidino, pyrrolidino, morpholino, cyclohexylamino or N-methylcyclohexylamino, at least one of $R_1$, $R_2$, $R_3$ and $R_4$ is a substituent other than hydroge, lower alkyl and halogen.

2. An assembly according to claim 1 wherein the colour former present is of formula (1) wherein both the symbols Y represent an amino substituted phenyl radical.

3. An assembly according to claim 1 wherein the colour former present is of formula (2) wherein $R_1$, $R_2$, $R_3$ and $R_4$ are each alkyl groups having from 1 to 3 carbon atoms and $R_5$ is phenyl.

4. An assembly according to claim 1 wherein the colour former present is colour former A, B or C as hereinbefore set forth or is benzoyl leuco methylene blue.

5. An assembly according to claim 1 wherein the polychlorinated hydrocarbon is either polyvinylchloride or polyvinylidene chloride.

6. An assembly according to claim 5 wherein the solvent for the polyvinyl chloride or polyvinylidene chloride is 2,4-dichlorotoluene.

7. An assembly according to claim 1 wherein the binder for the aqueous emulsion is either gelatin or modified gelatin.

8. An assembly according to claim 1 wherein a whitening agent is present in the binder layer.

9. An assembly according to claim 8 wherein the whitening agent is titanium oxide.

10. An assembly according to claim 1 wherein a compound of a heavy element is present in a layer of the assembly.

11. An assembly according to claim 10 wherein the heavy element has an atomic number equal to or higher than 56.

12. An assembly according to claim 11 wherein the heavy element is lead.

13. An assembly according to claim 10 wherein the compound of lead is lead chloride.

14. An assembly according to claim 1, which is a single layer assembly to monitor levels of radiation of from 0.1 to 1.0 MRad and which contains in this single layer at least one colour former of the formulae (1) to (4), a polychlorinated hydrocarbon and a heavy metal compound.

15. An assembly according to claim 1 wherein there is present in the assembly a top layer which comprises an emulsion of a heavy metal compound in a binder, a middle layer which comprises in a binder an emulsion of a polychlorinated hydrocarbon and the colour former and an underlayer next to the base which comprises an emulsion of a heavy metal compound in a binder.

16. An assembly according to claim 15 which is used to monitor levels of radiation of from 1.0 to 10.0 MRads.

17. An assembly according to claim 15 where there is present both in the topmost layer and in the underlayer a U.V. absorbing compound.

18. An assembly according to claim 15 where there is present also in the middle layer which comprises the colour former a U.V. absorbing compound.

19. An assembly according to claim 15 where there is present also in the middle layer which comprises the colour former titanium dioxide as a whitening agent.

20. An assembly according to claim 1 wherein the base is an opaque photographic paper base.

* * * * *